United States Patent
Banat et al.

(10) Patent No.: US 8,669,334 B2
(45) Date of Patent: Mar. 11, 2014

(54) OLEFIN GAS PHASE POLYMERISATION

(75) Inventors: Yahya Banat, Riyadh (SA); Fahad Al-Obaidi, Riyadh (SA); Abdul Kader Malek, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 13/699,080

(22) PCT Filed: May 12, 2011

(86) PCT No.: PCT/EP2011/002386
§ 371 (c)(1),
(2), (4) Date: Nov. 20, 2012

(87) PCT Pub. No.: WO2011/147539
PCT Pub. Date: Dec. 1, 2011

(65) Prior Publication Data
US 2013/0066027 A1  Mar. 14, 2013

(30) Foreign Application Priority Data
May 27, 2010 (EP) .................................... 10075226

(51) Int. Cl.
C08F 2/00 (2006.01)
C08G 85/00 (2006.01)
B01J 19/18 (2006.01)
C08F 210/00 (2006.01)

(52) U.S. Cl.
USPC ................... 526/68; 526/69; 526/70; 526/88; 526/348; 422/132

(58) Field of Classification Search
USPC ................... 526/68, 69, 70, 88, 348; 422/132
See application file for complete search history.

(56) References Cited

U.S. PATENT DOCUMENTS

| 4,543,399 A | 9/1985 | Jenkins, III et al. |
| 4,588,790 A | 5/1986 | Jenkins, III et al. |
| 5,352,749 A | 10/1994 | DeChellis et al. |
| 5,436,304 A | 7/1995 | Griffin et al. |
| 6,335,175 B1 | 1/2002 | Tsuganezawa et al. |
| 6,759,489 B1 | 7/2004 | Turkistani |
| 8,067,509 B2 * | 11/2011 | Hussein et al. ................. 526/64 |
| 2005/0182207 A1 * | 8/2005 | Singh et al. ..................... 526/68 |

FOREIGN PATENT DOCUMENTS

EP  1196238 B1  11/2003

OTHER PUBLICATIONS

Extended European Search Report; European Application No. 10075226.0; Date of Mailing: Oct. 20, 2010; 7 Pages.
Fraser et al.; "Manufacturing Efficiencies From Metallocene Catalysis in Gas-Phase Polyethylene Production"; Univation Technologies; 1997; 8 Pages.
International Search Report; International Application No. PCT/EP2011/02386; International Filing Date: May 12, 2011; Date of Mailing: Aug. 1, 2011; 5 Pages.
Written Opinion; International Application No. PCT/EP2011/02386; International Filing Date: May 12, 2011; Date of Mailing: Aug. 1, 2011; 7 Pages.

* cited by examiner

*Primary Examiner* — William Cheung
(74) *Attorney, Agent, or Firm* — Cantor Colburn LLP

(57) ABSTRACT

The invention is directed to a process for the gas phase polymerization of one or more olefin monomers in a fluidized bed reactor in a dry mode or in a (super) condensed mode with a gas stream comprising an inert gas characterized in that the inert gas comprises a mixture of inert components: (1) nitrogen; (2) a gas heat capacity increasing agent (3) a sorption promoting agent and (4) a polymer swelling agent. The inert gas may comprise (1) 5-60% by mol nitrogen (2) 10-90% by mol ethane (3) 1-50% by mol % n-butane and (4) 0.1-10% by mol % n-pentane or iso-pentane.

12 Claims, No Drawings

OLEFIN GAS PHASE POLYMERISATION

This application is a 371 of International Application No. PCT/EP2011/002386, filed May 12, 2011, which claims priority to European Application No. 10075226.0, filed May 27, 2010, both of which are hereby incorporated by reference in its entirety.

The invention relates to a process for the polymerisation of olefin monomers, preferably ethylene monomers, in a gas phase polymerization process in a fluidised bed reactor.

Olefin polymerization is a very exothermic reaction. Heat needs to be removed continuously so as to keep the temperature in the reactor at the desired level. Such removal may be effected via the gas stream which leaves the reactor at a higher temperature than that at which it is supplied to the reactor. In gas phase polymerization the removal of heat from the bed of growing polymer tends to be a rate limiting step.

Conventionally, gas phase polymerization processes typically run continuously, therefore the temperature of the fluidized bed reactor is controlled to an essentially isothermal level through continuously removing the heat of polymerization by circulating the gas exiting from the fluidized bed to a condenser/heat exchanger outside the reactor and recirculating the cooled gas stream back into the reactor. When the temperature of the recirculating stream introduced or recycled into the fluidized bed polymerization reactor is above the dew point temperature, substantially no liquid is present. This process is known as the "dry mode" process. One method to maximize the ability of heat removal is, throughout the operation, to reduce to the lowest possible value the temperature of the gaseous feed stream into the reactor.

According to the "condensed mode" process a two phase mixture is directed into the fluidized bed as a fluidizing medium, the liquid portion of which vaporizes when it is exposed to the heat of the reactor. Fluid is formed by cooling the recycle stream below the dew point temperature, thereby converting a portion of the gas into a liquid, and the cooled recycle stream is introduced into the fluidized bed polymerization reactor. The objective is to take advantage of the cooling effect brought about by the vaporization, i.e., by bringing the temperature of the fluidized bed down to a point where degradation of the polymer and the catalyst are avoided and agglomeration of the polymer and chunking are prevented. The liquid phase is provided by a portion of the recycle gases, which includes monomers and low boiling liquid hydrocarbons, inert to the reaction conditions needed for polymerization, and condensation. Condensed mode fluidized bed reactor polymerization processes are disclosed in for example U.S. Pat. No. 4,543,399 and U.S. Pat. No. 4,588,790. These publications describe the introduction of an inert liquid into the recycle stream to increase the dew point temperature of the recycle stream and allowing the process to operate at levels of up to 17.4% liquid by weight, based on the total weight of the cooled recycle stream. A condensed mode process is advantageous because its ability to remove greater quantities of heat generated by polymerization increases the polymer production capacity of a fluidized bed polymerization reactor. A commonly used liquid hydrocarbon is isopentane, which boils at about 27° C., and consequently becomes a vapor in the recycle line in view of the heat present in the recycle gases. The recycle gases leave the reactor, are cooled, and then condensed to the extent that a vapor phase and liquid phase are formed. The velocity of the recycled gas/liquid mixture should be sufficient to support the fluidized bed, but slow enough to avoid excessive entrainment of fines. The cooling capacity should be sufficient to improve the production rate in terms of space/time/yield.

"Super condensed mode" fluidized bed reactor polymerization processes operate with above 17.4% liquid by weight in the cooled recycle stream as described for example in U.S. Pat. No. 5,352,749. These must be confined under certain more specific and restrictive conditions within a limited range of operating conditions to avoid destabilizing the fluidized bed, thereby halting the process.

Condensed and super condensed mode processes have been limited due to several factors including only an estimate of the amount of liquid entering the bed was controlled/monitored. The negatives reside in the limit placed upon the production rate, i.e., space/time/yield, which is influenced by the maximum rate at which heat can be removed from the reactor; the introduction of hydrocarbons other than monomers, which, although considered inert, can affect the polymer morphology and the static, chunking, and sheeting, which plague many polymerization runs; flooding and frothing at the bottom of the reactor due to too much liquid; and the requirement for additional cooling and condensing equipment for converting the recycle stream to the gas/liquid mixture.

Fraser et al. discloses in "Manufacturing efficiencies from metallocene catalysis in gas phase polyethylene production" (1997, Univation Technologies) the general concept of the olefin gas phase process. Generally in gas phase polymerization of olefins the feed stream passes through a fluidized or stirred bed of growing polymer particles. The growing polymer particles are fluidised by a recycle gas stream of monomer, co-monomer, hydrogen, nitrogen and inert condensing gas. The cycle gas flow provides monomer and co-monomer for polymerization, agitates the bed and also removes the heat of polymerization. The cycle gas exits the top of the reactor and is then compressed through a compressor and cooled via a heat exchanger before being fed into the bottom of the fluidised bed. The recycle stream is made up with additional feed stream and returned to the bed of growing polymer. The monomer in the feed stream contacts the catalyst in the growing polymer particles and is polymerized.

A preferred reactor system to be applied for this gas phase polymerisation is a vertical elongated reactor in which a bed of polymer particles is maintained in fluidised condition with the aid of an ascending gas feed stream which contains the gaseous monomer(s) to be polymerised. The reactor comprises a reaction zone which is confined at the underside by a gas distribution plate and at the top side by a virtual end surface, in which the fluidised bed is maintained between the underside and the top side and in which at least part of the gaseous stream withdrawn from the top of the reactor is cooled to a point where the stream partially condenses into a liquid, and in which at least part of the resulting two-phase stream is recycled to the reactor via an inlet which terminates in the reactor below the gas distribution plate.

The ascending gas stream may contain an inert gas and for example hydrogen as a chain length regulator. The inert gas is added to control the dew point of the gas mixture. Suitable inert gases include for example nitrogen and inert hydrocarbons such as (iso)butane, (iso)pentane and (iso)hexane. The inert gas may be added to the gas stream as a gas or, in condensed form, as a liquid. The gas stream is discharged through the top of the reactor and, after certain processing operations, fresh monomer is added to it to make up for the monomer(s) consumed in the polymerisation, and then the gas stream is again supplied to the reactor as (a portion of) the ascending gas stream in order to maintain the bed. A catalyst is also added to the bed.

It is a disadvantage of the known processes to promote the levels of condensation in the recycle stream that are required to enter the super-condensed regimen requires such amounts of non-volatile constituents that may harm the stable operation of the reactor. In order to reach higher production rates, the attainment of higher heat removal ability is not sufficient, since it is also essential to keep a stable operation. In case the stable operation cannot be kept as such, the heat removal ability is no longer the limiting factor for the production rate, while the advantage of the operation in the condensed and super-condensed modes is lost. The difficulties in keeping the process stability in the super-condensed mode as well as the ways of keeping pace with those drawbacks are discussed in U.S. Pat. No. 5,352,749 and U.S. Pat. No. 5,436,304.

In further variations of the gas phase polymerization process, where co-monomers of longer chains and consequently lower volatility such as 1-pentene, 1-hexene or 1-octene are applied in relatively high amounts for copolymerizing with the primary monomer, due to problems related to the suitable heat removal and to the stability of the reactor bed; the combination of the process conditions with the features of such monomers may lead to the partial condensation of said co-monomers and to the consequent impossibility to operate the process under high production rates.

EP1196238 discloses a process for the gas phase polymerisation of one or more olefin monomers in a fluidised bed reactor, which reactor comprises a reaction zone which is confined at the underside by a gas distribution plate and at the top side by a virtual end surface, in which a fluidised bed is maintained between the underside and the top side, and in which at least part of the gaseous stream withdrawn from the top of the reactor is cooled and in which at least part of the resulting two-phase stream is recycled to the reactor and wherein the gas stream comprises an inert gas.

In general, the conventional fluidized bed reactors used in gas-phase olefin polymerization may have a cylindrical shaped fluidized bed section and an enlarged conical entrainment disengaging section. During the course of polymerization, fresh polymer particles are produced by catalytic polymerization of olefin, e.g. ethylene. Such polymer particles are projected upward into the disengaging section through the flowing gas and most of these particles return to the fluidized bed by gravity as their velocity decreases in the disengaging section. However, some of fine particles "fines" are elutriated out of the projected particles and do not return to the fluidized bed by gravity. Such fines either leave with the flowing gas through the reactor outlet or accumulate in the disengaging section. Consequently, high levels of fines in the reactor may cause significant operating difficulties either within the reactor itself, or outside the reactor represented by piping system, heat exchangers, compressors, and reactor inlet gas distribution grid. Within the fluidized bed section, fines are considered the major reason for the formation of wall sheeting.

It is the object of the present invention to provide a process for the polymerisation of one or more olefin monomers in a gas phase polymerization process in a fluidised bed reactor that combines running the fluidized bed reactor with cooling capacity sufficient to improve the production rate of dry mode and (super-)condensed mode fluidized bed reactor polymerization processes.

Furthermore the desired polymer properties for example a high polymer particle density, a high polymer bulk density, a high catalyst productivity and improved polymer morphology should be obtained.

This object is achieved with a process for the gas phase polymerisation of one or more olefin monomers in a fluidised bed reactor in a dry mode or in a (super) condensed mode with a gas stream comprising an inert gas, characterised in that the inert gas comprises a mixture of inert components:

(1) nitrogen (2) a gas heat capacity increasing agent which regulates the dew point and at the same time improves the vapor stream heat capacity (3) a sorption promoting agent which acts as promoting agent of the ethylene and alpha olefins local concentrations at the growing polymer micro-particle level where sorption of such components into the polyethylene increases the local concentration of ethylene and/or alpha-olefins in terms of micro-conditions surrounding the catalyst active sites and (4) a polymer swelling agent which acts as a polymer physical and viscoelastic properties modifying agent, developed instantaneously during polymer growth, by swelling and plasticizing the polymer formed during growth and which agent influences the characteristics of the crystalline phase.

According to a preferred embodiment of the invention the process takes place in a reactor which comprises a reaction zone which is confined at the underside by a gas distribution plate and at the top side by a virtual end surface, in which a fluidised bed is maintained between the underside and the top side, and in which at least part of the gaseous stream withdrawn from the top of the reactor is cooled and in which at least part of the resulting two-phase stream is recycled to the reactor and wherein the gas stream comprises an inert gas, comprising a mixture of inert components:

(1) nitrogen (2) a gas heat capacity increasing agent (3) a sorption promoting agent and (4) a polymer swelling agent.

The recycle stream is made up with additional feed stream and returned to the bed of growing polymer. The feed stream in the recycle stream comprises olefin monomers and the mixture of inert components.

According to a preferred embodiment the olefin is ethylene. In case the olefin is ethylene, the amount of ethylene in the feed stream ranges between 50% by weight and 95% by weight of the total amount of olefin monomers. Suitable co-monomers include for example 1-butene, 1-hexene and propylene.

The process according to the invention results in an improved process especially in terms of space/time/yield and at the same time enabling a broader range of operating conditions of the fluidized bed reactor polymerization process.

According to a preferred embodiment of the invention the gas phase polymerisation takes place via the (super) condensed mode process.

According to a preferred embodiment of the invention the inert gas comprises (1) 5-60% by mol nitrogen (2) 10-90% by mol of the gas heat capacity increasing agent (3) 1-50% by mol of the sorption promoting agent, and (4) 0.1-10% by mol of the polymer swelling agent wherein the total amount of the inert components (1), (2), (3) and (4) is 100%.

Preferably the inert components are saturated compounds.

The gas heat capacity increasing agent in the feed stream to a gas phase reactor regulates the dew point and at the same time improves the vapor stream heat capacity.

Preferably the gas heat capacity increasing agent is a saturated ($C_2$-$C_4$) hydrocarbon or a mixture of at least two different saturated ($C_2$-$C_4$) hydrocarbons.

More preferably the gas heat capacity increasing agent is a saturated ($C_2$-$C_3$) hydrocarbon or a mixture of these hydrocarbons.

Most preferably the gas heat capacity increasing agent is ethane.

The sorption promoting agent acts as promoting agent of the ethylene and alpha olefins local concentrations at the growing polymer micro-particle level where sorption of such components into the polyethylene increases the local concentration of ethylene and/or alpha-olefins in terms of micro-conditions surrounding the catalyst active sites. This physical phenomenon is known as co-solubility.

Preferably the sorption promoting agent is a saturated ($C_4$-$C_7$) hydrocarbon or a mixture of at least two different saturated ($C_4$-$C_7$) hydrocarbons.

More preferably the sorption promoting agent is the ($C_4$) hydrocarbon n-butane.

It is an advantage of the present invention that the sorption of the hydrocarbons into the growing polymer particles permits promoting catalyst activity.

The polymer swelling agent acts as a polymer physical and viscoelastic properties modifying agent, developed instantaneously during polymer growth, by swelling and plasticizing the polymer formed during growth. Furthermore the polymer swelling agent influences the characteristics of the crystalline phase, such as crystallinity, lamellar thickness, and the interfacial structure of crystallites. Additionally the polymer swelling agent functions as a delaying agent for the crystallization kinetics during polymer growth. Accordingly the swelling agent reduces the production of fines during polymerization and additionally the swelling agent increases the particle density through controlling the catalyst fragmentation. Generally the applied swelling agents have a normal boiling point higher than 40° C.

Preferably the polymer swelling agent is a saturated ($C_5$-$C_{20}$) hydrocarbon or a mixture of at least two different saturated ($C_5$-$C_{20}$) hydrocarbons.

More preferably the polymer swelling agent is n-pentane or iso-pentane.

It is possible to apply for example iso-pentane as the sorption promoting agent and also as swelling promoting agent. In this case iso-pentane may be present in an amount between for example 1.1 and 60% by mole.

According to a further preferred embodiment of the invention the mixture comprises
(1) 10-50% by mol of nitrogen
(2) 25-80% by mol of a ($C_2$-$C_4$) hydrocarbon
(3) 1-45% by mol of a ($C_4$-$C_7$) hydrocarbon and
(4) 0.2-7% by mol of a ($C_5$-$C_{20}$) hydrocarbon
wherein the total amount of the inert components (1), (2), (3) and (4) is 100%.

According to another preferred embodiment of the invention the mixture comprises
(1) 10-50% by mol of nitrogen
(2) 25-80% by mol of a ($C_2$-$C_3$) hydrocarbon
(3) 1-45% by mol of a ($C_4$) hydrocarbon and
(4) 0.2-7% by mol of a ($C_5$-$C_{20}$) hydrocarbon
wherein the total amount of the inert components (1), (2), (3) and (4) is 100%.

According to a further preferred embodiment of the invention the mixture comprises
(1) nitrogen
(2) ethane
(3) n-butane and
(4) n-pentane or iso-pentane
wherein the total amount of the inert components (1), (2), (3) and (4) is 100%.

Preferably the mixture comprises
(1) 5-60% by mol of nitrogen
(2) 10-90% by mol of ethane
(3) 1-50% by mol of n-butane and
(4) 0.1-10% by mol of n-pentane or iso-pentane
wherein the total amount of the inert components (1), (2), (3) and (4) is 100%.

More preferably the mixture comprises
(1) 10-50% by mol of nitrogen
(2) 25-80% by mol of ethane
(3) 5-45% by mol of n-butane and
(4) 0.1-45% by mol of n-pentane or iso-pentane
wherein the total amount of the inert components (1), (2), (3) and (4) is 100%.

The polymerization process according to the present invention combines running the fluidized bed reactor with cooling capacity sufficient to improve the production rate in terms of space/time/yield and at the same time enabling a broader range of operating conditions of a dry and condensed mode fluidized bed reactor polymerization method regardless of the type of catalyst used and polymer properties with high polymer particle density, polymer bulk density, promoted catalyst productivity and improved polymer morphology process for the reduction of powder fines in a fluid bed polyethylene process.

It is another advantage that the process according to the invention results in a reduction of fines to a low level in for example the polyethylene production process of a fluid bed reactor through the introduction of promoting agents of the ethylene and alpha olefins local concentrations at the growing polymer micro-particle level and through the introduction at the same time agents of instantaneous viscoelastic local properties improving agents while furthermore at the same time the maintenance of the operation without stability problems in the reactor bed or of entrainment of polymer particles is secured.

The process according to the present invention comprises (co)polymerizing a feed of gaseous olefin monomers under polymerization conditions, in gas phase reactors, in the condensed or non condensed mode where a specific mole fraction of the recycle stream is made up of inert components, admixed in specific amounts, said compositions maximize the heat transport properties both microscopically (at the particle level) and macroscopically (at the reactor level). Macroscopic implies the total volume of the reactor whereas microscopic refers to the immediate vicinity around the catalytic sites where polymerization takes place. When cooling improves, catalyst productivity and polymer properties will improve. At the same time, reactor operability becomes more robust since hot spotting, sheeting, and chunking are reduced.

The use of the swelling agent results in improved viscoelastic properties in addition to better heat removal through all components and consequently the process according to the present invention results in a reduced amount of fines.

The process according to the present invention is suitable for the manufacture of polyolefins in the gas phase by the polymerisation of one or more olefin monomers. The polymers may be homopolymers and copolymers of ethylene and/or propylene or copolymers of ethylene or propylene with one or more $C_2$-$C_8$ alpha-olefins such as for example ethylene, propylene, butene-1, pentene-1, hexene-1,4-methylpentene-1, and octene-1. Higher olefins for example decene-1 or dienes for example 1,4-butadiene, 1,6-hexadiene, dicyclopentadiene, ethylidene norbornene and vinyl norbornene may also be applied.

Preferably the process is an ethylene homo polymerization or an ethylene-alpha-olefin co-polymerization process.

Preferably the pressure of the polymerisation process ranges between 0.5 and 10 MPa and the temperature ranges between 30° C. and 130° C.

A catalyst is also added to the bed. During the process, under the influence of the catalyst present, fresh polymer is continuously formed and at the same time polymer that has formed is withdrawn from the bed, with the bed volume and mass being kept substantially constant.

It is another advantage of the present invention that the object is obtained regardless of the applied type of catalyst.

The polymerisation reaction may be carried out in the presence of any known suitable catalyst system for the gas phase polymerisation for example a catalyst system of the Ziegler-Natta type, a chromium based catalyst system and a metallocene based catalyst system.

The catalyst may also be in the form of a prepolymer powder prepared in a prepolymerisation stage with the aid of a catalyst system described above. The prepolymerisation may be carried out by any known process, for example, polymerisation in a liquid hydrocarbon diluent or in the gas phase using a batch process, a semi-continuous process or a continuous process.

US2005/182207 discloses a continuous gas fluidized bed polymerization process for the production of a polymer from a monomer including continuously passing a gaseous stream comprising the monomer through a fluidized bed reactor in the presence of a catalyst under reactive conditions; withdrawing a polymeric product and a stream comprising unreacted monomer gases; cooling said stream comprising unreacted monomer gases to form a mixture comprising a gas phase and a liquid phase and reintroducing said mixture into said reactor with sufficient additional monomer to replace that monomer polymerized and withdrawn as the product, wherein said liquid phase is vaporized, and wherein the stream comprises at least two inert condensing agents selected from the group consisting of alkanes and cycloalkanes. US 2005/0182207 applies at least two inert condensing agents of normal boiling point less than 40° C. Technically this means that the inert component condenses at the inlet conditions below the distributor plate. Therefore, ethane is not used since it does not condense by itself in the absence of other induced condensing agent. Ethane is not an induced condensing agent. Additionally, ethane with low concentration (0 mol %-4 mol %) will be present in any gas phase ethylene polymerization process as impurity with ethylene feedstock or being generated in the reactor due to hydrogenation of ethylene or even as a by product of metal alkyls reaction with traces of water in the reactor. Furthermore, in contrast to US 2005/0182207 in the present patent application swelling agents are applied which have generally a normal boiling point higher than 40° C.

U.S. Pat. No. 6,759,489 discloses a continuous gas fluidized bed methods for making a polymer featuring a condensing agent in a recycle stream and also to methods for monitoring and providing continuity in a gas fluidized bed method for making a polymer featuring a condensing agent in a recycle stream.

U.S. Pat. No. 5,436,304 relates to a process for polymerizing alpha-olefins in a gas phase reactor at significantly higher production rates than herefore envisaged. The invention is directed toward a process for polymerizing alpha-olefins in a gas phase reactor having a fluidized bed and a fluidizing medium where the level of liquid in the fluidizing medium is greater than 15 weight percent based on the total weight of the fluidizing medium. Further U.S. Pat. No. 5,436,304 relates to a method for determining stable operating conditions of a gas phase fluidized bed polymerization reactor by identifying a property useful to determine stability of a fluidized bed and controlling the composition of a fluidizing medium or recycle stream to establish a range of values for the property to maintain the stable operating condition.

U.S. Pat. No. 5,352,749 discloses a process for polymerizing alpha-olefin(s) in a gas phase reactor having a fluidized bed and a fluidizing medium wherein the fluidizing medium serves to control the cooling capacity of said reactor, the improvement comprising employing a level of liquid in the fluidizing medium entering the reactor which is in the range of from 17.4 to 50 weight percent based on the total weight of the fluidizing medium and maintaining the ratio of fluidized bulk density to settled bulk density above 0.59.

US2005/182207, U.S. Pat. No. 6,759,489, U.S. Pat. No. 5,436,304 and U.S. Pat. No. 5,352,749 do not describe the use of a mixture of inert components comprising nitrogen, a gas heat capacity increasing agent, a sorption promoting agent and a polymer swelling agent.

US2005/182207, U.S. Pat. No. 6,759,489, U.S. Pat. No. 5,436,304 and U.S. Pat. No. 5,352,749 do not describe the specific mixture comprising 5-60% by mol nitrogen; 10-90% by mol of the gas heat capacity increasing agent; 1-50% by mol of the sorption promoting agent and 0.1-10% by mol of the polymer swelling agent.

US2005/182207, U.S. Pat. No. 6,759,489, U.S. Pat. No. 5,436,304 and U.S. Pat. No. 5,352,749 do not describe the specific mixture comprising 5-60% by mol of nitrogen; 10-90% by mol of ethane; 1-50% by mol of n-butane and 0.1-10% by mol of n-pentane or iso-pentane.

The invention will be elucidated by means of the following non-limiting examples.

Examples I-II and Comparative Example A

A polymerization process in fluidized bed was used to carry out the polymerization of ethylene and 1-hexene in the non condensed dry mode in accordance with the conditions as disclosed in Example 9 of U.S. Pat. No. 4,588,790.

In Example I iso-pentane was replaced partially (about 25%) by n-pentane. n-pentane has a higher solubility than iso-pentane in polyethylene by about 12% and n-pentane has higher heat transfer capabilities than iso-pentane by about 4%.

In Example II iso-pentane was replaced by a mixture of n-butane and n-pentane. n-pentane has higher solubility than iso-pentane in polyethylene by about 12% and n-butane has a lower solubility by about 40% Further, n-pentane has higher heat transfer capabilities than iso-pentane by about 4%, n-butane has much lower boiling point of –0.6° C. compared to a boiling point of 27.8° C. for iso-pentane and with approximately similar heat transfer capabilities as iso-pentane.

Comparing Examples I and comparative Example A, an increase in the production rate of about 24 percent was obtained by replacing more than 70% of nitrogen by ethane and use of n-pentane and iso pentane.

Comparing comparative Example A and Example II, an improvement in the production rate of about 28 percent was obtained by replacing more than 70% of nitrogen by ethane and n-butane to maximize the heat transport properties both microscopically at the particle level and macroscopically at the reactor level.

TABLE 1

| Example | A | I | II |
|---|---|---|---|
| Internal Reactor diameter (m) | 3.5 | 3.5 | 3.5 |
| Recycle Gas Superficial Velocity (m/s) | 0.673 | 0.673 | 0.673 |

TABLE 1-continued

| Example | A | I | II |
|---|---|---|---|
| Recycle Gas Composition (mole fraction): | | | |
| Ethylene | 0.393 | 0.393 | 0.393 |
| 1-Hexene (co-monomer) | 0.047 | 0.047 | 0.047 |
| Hydrogen | 0.062 | 0.062 | 0.062 |
| Nitrogen | 0.358 | 0.1 | 0.085 |
| Ethane (gas heat capacity increasing agent) | 0.126 | 0.384 | 0.38 |
| Iso-pentane (sorption promoting and polymer swelling promoting agent) | 0.014 | 0.010 | 0 |
| n-Butane (sorption promoting agent) | — | — | 0.03 |
| n-Pentane (polymer swelling agent) | — | 0.004 | 0.003 |
| Recycle Gas Density (kg/m$^3$) | 22.84 | 24.12 | 24.55 |
| Reactor Temperature (° C.) | 94.9 | 94.9 | 94.9 |
| Reactor Inlet Temperature (° C.) | 61.6 | 61.6 | 61.6 |
| Reactor Pressure (psig) | 309.2 | 309.2 | 309.2 |
| Reactor inlet Pressure (psig) | 323.5 | 323.5 | 323.5 |
| Inlet Dew Point Temperature (° C.) | 59.0 | 59.9 | 60.0 |
| Operation Mode | dry | dry | dry |
| Condensed Liquid in Recycle Stream (% weight) | — | — | — |
| Production Rate (ton/h) | 9.87 | 12.26 | 12.60 |

Examples III-IV and Comparative Example B

A polymerization process in fluidized bed was carried out in accordance with the disclosure of Example 9 in U.S. Pat. No. 4,588,790.

The examples show an increase in the production rate of about 8 and 11 percent, respectively, obtained in condensed mode of operation by replacing more than 40% of nitrogen by ethane (Example III) and more than 90% of nitrogen by ethane (Example IV).

TABLE 2

| Example | B | III | IV |
|---|---|---|---|
| Internal Reactor diameter (m) | 3.5 | 3.5 | 3.5 |
| Recycle Gas Superficial Velocity (m/s) | 0.64 | 0.64 | 0.64 |
| Recycle Gas Composition (mole fraction): | | | |
| Ethylene | 0.474 | 0.474 | 0.393 |
| 1-Hexene | 0.056 | 0.056 | 0.047 |
| Hydrogen | 0.074 | 0.074 | 0.062 |
| Nitrogen | 0.27 | 0.164 | 0.085 |
| Ethane (gas heat capacity increasing agent) | 0.114 | 0.222 | 0.38 |
| Iso-pentane (sorption promoting and polymer swelling promoting agent) | 0.012 | 0.0075 | 0 |
| n-Butane (sorption promoting agent) | — | — | 0.03 |
| n-Pentane (polymer swelling agent) | — | 0.0025 | 0.003 |
| Recycle Gas Density (kg/m$^3$) | 22.95 | 23.39 | 23.71 |
| Reactor Temperature (° C.) | 94.7 | 94.7 | 94.7 |
| Reactor Inlet Temperature (° C.) | 56.1 | 56.1 | 56.1 |
| Reactor Pressure (psig) | 306.8 | 306.8 | 306.8 |
| Reactor inlet Pressure (psig) | 321.1 | 321.1 | 321.1 |
| Inlet Dew Point Temperature (° C.) | 62.6 | 62.7 | 62.8 |
| Operation Mode | Condensed | Condensed | Condensed |
| Condensed Liquid in Recycle Stream (% weight) | 4.0 | 4.1 | 4.1 |
| Production Rate (ton/h) | 12.34 | 13.39 | 13.77 |

Examples V-VIII and Comparative Example C

The polymerization process of ethylene and 1-butene in the dry mode in fluidized bed was carried out in accordance with the conditions as disclosed in Example 10 of U.S. Pat. No. 4,588,790.

Comparing the Comparative Example C and Example V an increase in the production rate of about 11 percent was obtained in dry mode by replacing more than 60% of nitrogen by ethane without impacting the dew point of the inlet recycle stream.

Comparing the Comparative Example C and Example VI an increase in the production rate of about 26% was obtained by replacing about 50% of nitrogen by ethane, and the use of about 25% of iso-pentane as n-pentane.

In Example VI the use of about 68% of isopentane (compared to Comparative Example C) resulted in a remarkable reduction in the dew point of the inlet recycle stream which enabled lowering the recycle stream inlet temperature which contributed to further improvement of the production rate.

Example VII shows an increase in the production rate by replacing about 50% of nitrogen by ethane.

Example VIII shows an increase in the production rate of about 70 percent by replacing more than 50% of nitrogen by ethane, and the use of about 39% of isopentane (compared to Comparative Example C) with about 25% of iso-pentane as n-pentane.

TABLE 3

| Example | C | V | VI | VII | VIII |
|---|---|---|---|---|---|
| Internal Reactor diameter (m) | 2.44 | 2.44 | 2.44 | 2.44 | 2.44 |
| Recycle Gas Superficial Velocity (m/s) | 0.78 | 0.78 | 0.78 | 0.78 | 0.78 |
| Recycle Gas Composition (mole fraction): | | | | | |
| Ethylene | 0.4236 | 0.4236 | 0.427 | 0.427 | 0.427 |
| 1-Butene | 0.1558 | 0.1558 | 0.157 | 0.157 | 0.157 |
| Hydrogen | 0.0694 | 0.0694 | 0.070 | 0.07 | 0.07 |
| Nitrogen | 0.1915 | 0.0724 | 0.096 | 0.096 | 0.09 |
| Ethane (gas heat capacity increasing agent) | 0.0228 | 0.1419 | 0.137 | 0.147 | 0.183 |
| Iso-pentane (sorption promoting and polymer swelling promoting agent) | 0.1319 | 0.1319 | 0.090 | 0.075 | 0.052 |
| n-Butane (sorption promoting agent) | 0.0020 | 0.0020 | — | — | — |
| n-Pentane (polymer swelling agent) | — | — | 0.020 | 0.025 | 0.018 |
| Recycle Gas Density (kg/m$^3$) | 26.50 | 27.32 | 26.26 | 25.88 | 24.77 |
| Reactor Temperature (° C.) | 85.1 | 85.1 | 85.1 | 85.1 | 85.1 |
| Reactor Inlet Temperature (° C.) | 68.6 | 67.1 | 63.5 | 61.5 | 53.8 |
| Reactor Pressure (psig) | 269.4 | 269.4 | 269.4 | 269.4 | 269.4 |
| Reactor inlet Pressure (psig) | 284.5 | 284.5 | 284.5 | 284.5 | 284.5 |

TABLE 3-continued

| Example | C | V | VI | VII | VIII |
|---|---|---|---|---|---|
| Inlet Dew Point Temperature (° C.) | 66.2 | 65.4 | 61.7 | 59.8 | 52.2 |
| Operation Mode | Dry | Dry | Dry | Dry | Dry |
| Condensed Liquid in Recycle Stream (% weight) | — | — | — | — | — |
| Production Rate (ton/h) | 3.6 | 4.0 | 4.54 | 4.88 | 6.15 |

Examples IX-X and Comparative Example D

A polymerization process in fluidized bed was used to polymerize ethylene and 1-butene in the condensed mode in accordance with the disclosure of example 10.a in U.S. Pat. No. 4,588,790. Table 4 shows that when comparing the Comparative Example D, with Example IX and Example X an increase in the production rate of about 11 and 37 percent, respectively, was obtained.

TABLE 4

| Example | D | IX | X |
|---|---|---|---|
| Internal Reactor diameter (m) | 2.44 | 2.44 | 2.44 |
| Recycle Gas Superficial Velocity (m/s) | 0.49 | 0.49 | 0.49 |
| Recycle Gas Composition (mole fraction): | | | |
| Ethylene | 0.4377 | 0.446 | 0.446 |
| 1-Butene | 0.1590 | 0.162 | 0.162 |
| Hydrogen | 0.0883 | 0.09 | 0.090 |
| Nitrogen | 0.1600 | 0.09 | 0.080 |
| Ethane (gas heat capacity increasing agent) | 0.0236 | 0.112 | 0.090 |
| Iso-pentane (sorption promoting and polymer swelling promoting agent) | 0.1266 | 0.1 | — |
| n-Butane (sorption promoting agent) | 0.0020 | — | 0.120 |
| n-Pentane (polymer swelling agent) | — | — | 0.012 |
| Recycle Gas Density (kg/m$^3$) | 25.58 | 25.02 | 24.78 |
| Reactor Temperature (° C.) | 85.1 | 85.1 | 85.1 |
| Reactor Inlet Temperature (° C.) | 53.5 | 48.0 | 41 |
| Reactor Pressure (psig) | 264.9 | 264.9 | 264.9 |
| Reactor inlet Pressure (psig) | 276.2 | 276.2 | 276.2 |
| Inlet Dew Point Temperature (° C.) | 63.3 | 58.0 | 49.5 |
| Operation Mode | Condensed | Condensed | Condensed |
| Condensed Liquid in Recycle Stream (% weight) | 14.4 | 14.3 | 14.5 |
| Production Rate (ton/h) | 5.83 | 6.50 | 7.40 |

Examples XI-XIII and Comparative Example E

A polymerization process in fluidized bed for the polymerization of ethylene and 1-butene in the condensed mode was carried out in accordance with the disclosure of Example 6.2 from U.S. Pat. No. 6,759,489 B1.

Comparing the Comparative Example E and the Examples XI, XII and XIII an increase in the production rate of about 16, 21 and 16 percent, respectively, was obtained.

TABLE 5

| Example | E | XI | XII | XIII |
|---|---|---|---|---|
| Internal Reactor diameter (m) | 4.42 | 4.42 | 4.42 | 4.42 |
| Recycle Gas Superficial Velocity (m/s) | 0.77 | 0.77 | 0.77 | 0.77 |
| Recycle Gas Composition (mole fraction): | | | | |
| Ethylene | 0.3292 | 0.3292 | 0.3269 | 0.3269 |
| 1-Butene | 0.1319 | 0.1319 | 0.1310 | 0.1310 |
| Hydrogen | 0.0687 | 0.0687 | 0.0682 | 0.0682 |
| Nitrogen | 0.3433 | 0.1822 | 0.0820 | 0.0850 |
| Ethane (gas heat capacity increasing agent) | 0.0343 | 0.1954 | 0.2599 | 0.3119 |
| Iso-pentane (sorption promoting and polymer swelling promoting agent) | 0.0925 | 0.0925 | | 0.0770 |
| n-Butane (sorption promoting agent) | — | — | 0.1200 | — |

TABLE 5-continued

| Example | E | XI | XII | XIII |
|---|---|---|---|---|
| n-Pentane (polymer swelling agent) | — | — | 0.0120 | — |
| Recycle Gas Density (kg/m³) | 26.85 | 27.88 | 28.61 | 27.93 |
| Reactor Temperature (° C.) | 88 | 88 | 88 | 88 |
| Reactor Inlet Temperature (° C.) | 39.0 | 39.0 | 39.0 | 39.0 |
| Reactor Pressure (psig) | 305 | 305 | 305 | 305 |
| Reactor inlet Pressure (psig) | 320 | 320 | 320 | 320 |
| Inlet Dew Point Temperature (° C.) | 57.7 | 58.9 | 52.6 | 55.6 |
| Operation Mode | Condensed | Condensed | Condensed | Condensed |
| Condensed Liquid in Recycle Stream (% weight) | 21.0 | 22.0 | 21.2 | 20.1 |
| Production Rate (ton/h) | 45.6 | 52.9 | 55.6 | 52.7 |

Examples XIV-XVI and Comparative Example F

A polymerization process in fluidized bed was carried out to polymerize ethylene and 1-hexene in the condensed mode in accordance with the reaction conditions as disclosed in Example 3 in WO 99/06451.

Comparing the Comparative Example F and Examples XIV, XV and XVI in Table 6 shows an increase in the production rate of about 22, 32 and 43 percent, respectively was obtained.

TABLE 6

| Example | F | XIV | XV | XVI |
|---|---|---|---|---|
| Internal Reactor diameter (m) | 4.42 | 4.42 | 4.42 | 4.42 |
| Recycle Gas Superficial Velocity (m/s) | 0.77 | 0.77 | 0.77 | 0.77 |
| Recycle Gas Composition (mole fraction): | | | | |
| Ethylene | 0.333 | 0.333 | 0.333 | 0.333 |
| 1-Hexene | 0.047 | 0.047 | 0.047 | 0.047 |
| Hydrogen | 0.06 | 0.06 | 0.06 | 0.06 |
| Nitrogen | 0.458 | 0.158 | 0.1 | 0.09 |
| Ethane (heat capacity increasing agent) | 0 | 0.3 | 0.273 | 0.327 |
| Iso-pentane (sorption promoting and polymer swelling promoting agent) | 0.093 | 0.093 | — | — |
| n-Hexane | 0.009 | 0.009 | — | — |
| n-Butane (sorption swelling agent) | — | — | 0.17 | 0.13 |
| n-Pentane (polymer swelling agent) | — | — | 0.017 | 0.013 |
| Recycle Gas Density (kg/m³) | 25.33 | 27.07 | 28.55 | 27.33 |
| Reactor Temperature (° C.) | 87.0 | 87.0 | 87.0 | 87.0 |
| Reactor Inlet Temperature (° C.) | 51.0 | 51.0 | 51.0 | 43.0 |
| Reactor Pressure (psig) | 310 | 310 | 310 | 310 |
| Reactor inlet Pressure (psig) | 325 | 325 | 325 | 325 |
| Inlet Dew Point Temperature (° C.) | 77.6 | 78.1 | 74.4 | 70.5 |
| Operation Mode | Condensed | Condensed | Condensed | Condensed |
| Condensed Liquid in Recycle Stream (% weight) | 18.8 | 14.3 | 14.5 | 14.5 |
| Production Rate (ton/h) | 34.8 | 42.6 | 45.9 | 49.7 |

The invention claimed is:

1. A process for the gas phase polymerisation, comprising:

polymerizing an olefin monomer in a fluidised bed reactor in a dry mode or in a condensed mode with a gas stream comprising an inert gas, wherein the inert gas comprises a mixture of inert components:

(1) 5-60% by mole of nitrogen (2) 10-90% by mole of a gas heat capacity increasing agent which regulates the dew point and at the same time improves the vapor stream heat capacity (3) 1-50% by mole of a sorption promoting agent which acts as promoting agent of the ethylene and alpha olefins local concentrations at the growing polymer micro-particle level where sorption of such components into the polyethylene increases the local concentration of ethylene and/or alpha-olefins in terms of micro-conditions surrounding the catalyst active sites and (4) 0.1-10% by mole a polymer swelling agent which acts as a polymer physical and viscoelastic properties modifying agent, developed instantaneously during polymer growth, by swelling and plasticizing the polymer formed during growth and which agent influences the characteristics of the crystalline phase wherein the total amount of the inert components (1), (2), (3) and (4) is 100%.

2. The process according to claim 1, wherein the reactor comprises a reaction zone which is confined at the underside by a gas distribution plate and at the top side by a virtual end surface, in which a fluidised bed is maintained between the underside and the top side, and in which at least part of the gaseous stream withdrawn from the top of the reactor is cooled and in which at least part of the resulting two-phase stream is recycled to the reactor.

3. The process according to claim 1, wherein the gas heat capacity increasing agent is a saturated ($C_2$-$C_4$) hydrocarbon.

4. The process according to claim 1, wherein the sorption promoting agent is a saturated ($C_4$-$C_7$) hydrocarbon.

5. The process according to claim 1, wherein the polymer swelling agent is a saturated ($C_5$-$C_{20}$) hydrocarbon.

6. The process according to claim 1, wherein the olefin monomer is an ethylene monomer wherein the amount of ethylene in the feed stream ranges between 50% by weight and 95% by weight of the total amount of olefin monomers.

7. The process according to claim 1, wherein the gas heat capacity increasing agent is ethane.

8. The process according to claim 1, wherein the sorption promoting agent is n-butane.

9. The process according to claim 1, wherein the polymer swelling agent is n-pentane or iso-pentane.

10. The process according to claim 1, wherein the gas heat capacity increasing agent is ethane; wherein the sorption promoting agent is n-butane; and wherein the polymer swelling agent is n-pentane or iso-pentane.

11. A process for the gas phase polymerisation, comprising polymerizing an olefin monomer in a fluidised bed reactor in a dry mode or in a condensed mode with a gas stream comprising an inert gas, wherein the inert gas comprises a mixture of inert components:
   (1) 5-60% by mole of nitrogen
   (2) 10-90% by mole of a gas heat capacity increasing agent which regulates the dew point and at the same time improves the vapor stream heat capacity
   (3) 1-50% by mole of a sorption promoting agent which acts as promoting agent of the ethylene and alpha olefins local concentrations at the growing polymer micro-particle level where sorption of such components into the polyethylene increases the local concentration of ethylene and/or alpha-olefins in terms of micro-conditions surrounding the catalyst active sites and
   (4) 0.1-10% by mole of a polymer swelling agent which acts as a polymer physical and viscoelastic properties modifying agent, developed instantaneously during polymer growth, by swelling and plasticizing the polymer formed during growth and which agent influences the characteristics of the crystalline phase;
   wherein the reactor comprises a reaction zone which is confined at the underside by a gas distribution plate and at the top side by a virtual end surface, in which a fluidised bed is maintained between the underside and the top side, and in which at least part of the gaseous stream withdrawn from the top of the reactor is cooled and in which at least part of the resulting two-phase stream is recycled to the reactor;
   wherein the total amount of the inert components (1), (2), (3) and (4) is 100%.

12. The process according to claim 11, wherein the wherein the gas heat capacity increasing agent is ethane; wherein the sorption promoting agent is n-butane; and wherein the polymer swelling agent is n-pentane or iso-pentane.

* * * * *